United States Patent [19]

Heaslett et al.

[11] 3,881,194

[45] Apr. 29, 1975

[54] ELECTROMAGNETICALLY SWITCHED RECORD/REPRODUCE HEAD HAVING SEPARATE WINDINGS AND CORE LEGS FOR EACH MODE

[75] Inventors: Alastair M. Heaslett, Redwood; Beverley R. Gooch, Sunnyvale, both of Calif.

[73] Assignee: Ampex Corporation, Redwood City, Calif.

[22] Filed: Dec. 17, 1973

[21] Appl. No.: 425,518

[52] U.S. Cl. .................. 360/123; 360/62; 360/125

[51] Int. Cl. .... G11b 5/20; G11b 5/12; G11b 15/02

[58] Field of Search .......... 360/123, 125, 126, 127, 360/62

[56] References Cited

UNITED STATES PATENTS 2,891,236 6/1959 Eisenberg .......................... 360/123

*Primary Examiner*—Terrell W. Fears
*Assistant Examiner*—Robert S. Tupper

[57] ABSTRACT

A magnetic transducer head is configured to have multiple operating modes by providing a single pair of pole pieces with a back core having multiple legs, the switching between modes being accomplished by electromagnetically blocking the legs not used in a particular mode so that no appreciable signal flux will pass therethrough.

10 Claims, 7 Drawing Figures

ELECTROMAGNETICALLY SWITCHED RECORD/REPRODUCE HEAD HAVING SEPARATE WINDINGS AND CORE LEGS FOR EACH MODE

BACKGROUND OF THE INVENTION

This invention relates to a magnetic transducer head, and more particularly, relates to a magnetic transducer head which has multiple operating modes and which is electromagnetically switched from one operating mode to another.

Tape recorders often must operate in different modes. Generally, a magnetic circuit which is used to impress a signal on a magnetic medium will utilize a low impedance transducing coil. A record head, for example, cannot be allowed to resonate below the bias frequency used; a low impedance head, typically with a small number of turns in the transducing coil, will prevent such a resonance. On the other hand, when a magnetic signal is being read from a magnetic medium, it is desirable to use as many turns as possible on the transducing coil to provide the playback amplifier with a high e.m.f.; the high number of turns in the coil usually produces a relatively high impedance. These considerations with respect to the operating modes of tape recorders apply generally to all applications including digital, audio, video and instrumentation and require that magnetic transducing heads be fabricated with appropriate operating characteristics.

As an illustrative example from the above group, an audio transducing head will be discussed herein. Audio tape recorders typically have separate record and playback transducing heads which are switched on or off as the tape recorder is used in a particular mode. The heads are positioned in sequence along the path of the signal-carrying magnetic tape, must be individually mounted on the recorder and must be used with switching circuitry which will connect either head with its associated circuitry when the tape recorder is used in the particular mode. Multi-track record and playback heads are also usually fabricated as separate units and placed sequentially in position along the path of the signal-carrying magnetic tape. It would be desirable, then, in certain applications, for economy and space reasons, to have a single transducing head which is capable of operating in either a record or a playback mode, providing optimum operating characteristics in each mode could be obtained.

In professional studio operations, it is sometimes necessary to record additional audio information in synchronization with existing audio signals already recorded on a particular channel. If the individually mounted record and playback heads on a recorder as discussed above are used, normally then there will be a spatial separation and a time difference between the existing audio signal and the newly recorded signal. To avoid this problem, professional audio recorders offer a feature sold under the trademark SEL-SYNC (Registration No. 738,530 of Ampex Corporation). This feature permits an existing audio signal recorded on a particular channel to be played back by one of the heads of a multi-tract record head whilst one or more of the remaining heads on the multi-track record head are used to record the additional audio information in synchronization. Since all gaps on the multi-track record head are precisely mounted in the same plane, there is no spatial or time imbalance. Because of the different operating characteristics of record and playback heads as set out above, in order to operate a selected record head in a playback mode it is necessary to utilize a step-up transformer to match the impedance of the record head with that of the playback circuitry. It is also necessary to utilize complex switching circuitry, thus increasing the complexity and cost of the recorder. Thus, for this application, it would be desirable to have a magnetic transducing head which has multiple operating modes, e.g. record and playback, with optimal operating characteristics in each mode and which can be readily switched from one operating mode to another.

A seeming solution to the desirability of operating a single head in more than one mode would be to provide a head with multiple windings. This approach runs into difficulty because the multiple coils share the same magnetic path. Consequently, there is a high degree of mutual coupling between low impedance coils and high impedance coils with the result that the resonance of low impedance coils is largely determined by the resonance of the high impedance coils. This means that the frequency response of the record coil will not be linear in the desired region of operation, unless performance characteristics are compromised for either or both the record and playback functions.

Electromagnetic fields have been used to selectively interrupt the flow of signal flux in magnetic heads but have not been used for switching purposes. For example, in U.S. Pat. No. 2,999,135,two high frequency coils are used to intermittently saturate a segment of the signal flux path, thereby intermittently raising the reluctance of the path, so that the output voltage produced across the signal windings is proportional to the flux in the core and not to the rate of change of flux. A single signal winding is employed, although the single winding is disposed around both pole pieces.

It is accordingly an object of the present invention to provide a magnetic transducing head which is capable of operating in more than one mode.

It is another object of the present invention to provide a magnetic transducing head which is capable of operating as a record or as a playback head.

It is a further object of the present invention to provide a magnetic transducing head which has a multiple leg back core, at least one leg of which is suitable for record use and at least one leg of which is suitable for playback use.

It is an additional object of the present invention to provide a multi-mode magnetic transducing head which may be simply switched by electromagnetic means between a record mode using a low impedance winding and a playback mode using a high impedance winding.

It is a still further object of the present invention to provide a multi-mode magnetic transducing head which may be simply switched between modes by electromagnetically blocking the flow of magnetic flux through those portions of the magnetic circuit path not used in a particular mode.

SUMMARY OF THE INVENTION

A magnetic transducing head is provided with a multiple leg back core and a contiguous pair of pole pieces for contacting the signal-carrying magnetic medium. The multiple leg back core comprises at least two legs, one of which may be a low impedance record winding (therefore having a small number of turns) and one of which may be a high impedance playback winding (therefore having a higher number of turns).

The leg which is not used in a particular operating mode is effectively switched off by blocking the flow of magnetic flux so that no appreciable amount of signal flux passes through it. The limiting is accomplished electromagnetically. In one embodiment the unused coil is shorted to induce a counter magnetic field which physically opposes the flow of magnetic flux through the unused leg. In another embodiment a gating conductor is used to pass a current by each end of the leg not in use; this current has an associated magnetic field which produces a localized saturation at the ends of the leg, thereby greatly raising the reluctance, so that no appreciable amount of signal flux passes through the leg.

In an audio transducing head embodiment having a dual leg back core, the low impedance record leg is positioned adjacent the pole pieces and is fabricated from a material, e.g. ferrite, having desirable operating characteristics at high bias frequencies. The remaining leg on which the high impedance reproduce winding is wound is fabricated from a material, e.g. a high permeability alloy, which has a high permeability at audio frequencies.

BRIEF DESCRIPTION OF THE DRAWINGS

For a more complete understanding of the magnetic transducing head of the present invention, reference may be had to the drawings which are incorporated herein by reference and in which.

DESCRIPTION OF THE PREFERRED EMBODIMENT

As discussed above, the use of multiple windings on a magnetic transducer having a single leg back core to obtain multiple operating modes is fraught with mutual coupling problems. To use a particular transducer winding on a multiple winding head without interference from other windings, it is necessary to eliminate the effects of the unused winding. The rendering ineffectual of the unused coil is accomplished by the magnetic transducing head of the present invention.

Figure 1:
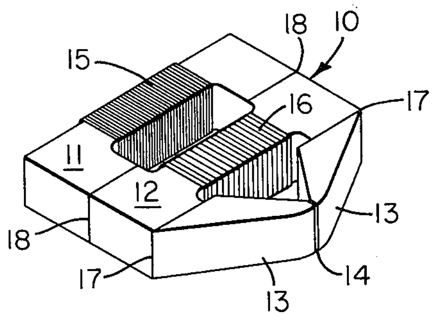
FIG. 1 is a perspective view of an audio magnetic transducing head illustrating the multiple leg back core of the present invention.
Figure 2:
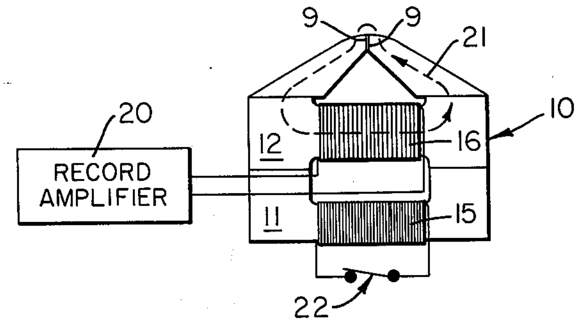
FIG. 2 is a plan schematic view of the audio head of FIG. 1 illustrating the shorting of the playback coil during the record mode in one embodiment of the present invention.

By reference now to FIGS. 1 and 2 it can be seen that a magnetic transducing head 10 has been fabricated with a two-leg back core consisting of legs 11 and 12. The front of head 10 consists of a pair of poles pieces 13 positioned in symmetrical opposition so that gap-defining surfaces 9 define a nonmagnetic transducing gap 14 therebetween. The gap-defining surfaces 9 are smoothly lapped so that the distance across the gap may be closely controlled. The gap is filled with standard filler material, e.g. glass, by techniques well known in the art.

While the head may be fabricated as an integral unit, in the version illustrated leg 12 is securely attached to pole pieces 13 along magnetic coupling interfaces 17 and leg 11 is securely attached to leg 12 along magnetic coupling interfaces 18; all surfaces are smoothly lapped to produce low reluctance joints. Such modular fabrication is desirable if different materials are to be used to obtain desired transducing characteristics; additionally, a great variety of heads can be fabricated from a few basic building blocks. Of course, for mass fabrication an integral unit may be preferred.

Figure 3:
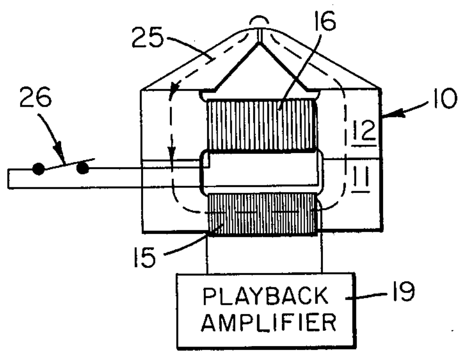
FIG. 3 is a plan schematic view of the magnetic transducer head of FIG. 2 illustrating the shorting of the record coil during the playback mode.

The rendering ineffectual of the back core legs not in use is accomplished by electromagnetically creating a barrier to physically oppose the flow of magnetic flux so that appreciably no signal flux flows through the unused legs, i.e. so that no more than 1% – 3% of the potential flux flow will occur. In addition to eliminating the flow of signal flux in the unused leg, the unused leg becomes decoupled so there is no degradation due to mutual coupling; the unused leg then has no effect on the active leg. In the embodiment of FIGS. 2 and 3 the transducing coil on the back core leg not in use is shorted. In FIG. 2 an audio head is operating in the record mode with the low impedance record winding 16 connected to the record amplifier 20 and the high impedance playback winding 15 shorted by closed switch 22. In the record mode magnetic signal flux generated by winding 16 will attempt to follow the dotted path as well as the path through leg 11 on which winding 15 is wound. As is known from Lenz's Law, when the signal flux begins to pass through the interior of leg 11, a current will be induced in winding 15. This current will in turn produce a magnetic field in leg 11 which opposes the passage therethrough of the signal flux. This so-called shorted turn effect blocks the passage of magnetic flux so that appreciably no signal flux passes through leg 11. The stronger the signal flux, the greater the induced current and the stronger the opposing flux. Thus, the signal flux follows the dotted path shown and is impressed on the moving magnetic tape. Mutual coupling between playback coil 15 and record coil 16 is also eliminated.

In FIG. 3 the audio head is operating in the playback mode with the high impedance playback coil 15 connected to the playback amplifier 19 and the low impedance record coil shorted by closed switch 26. In the playback mode the signal flux picked up from the moving magnetic tape will tend to flow through the dotted path shown in FIG. 3 and also through leg 12. As the signal flux begins to pass through the interior of back core leg 12, a current will be induced in coil 16. This current will in turn produce a magnetic field in back core leg 12 which opposes the passage therethrough of signal flux. As described above the passage of signal flux is effectively blocked by the induced counter flux.

Figure 4:
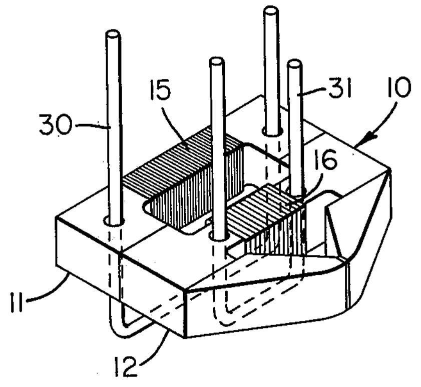
FIG. 4 is a perspective view of an audio magnetic transducing head illustrating the multiple leg back core of the present invention and gating turns passing through the ends of each leg in another embodiment of the present invention.
Figure 5:
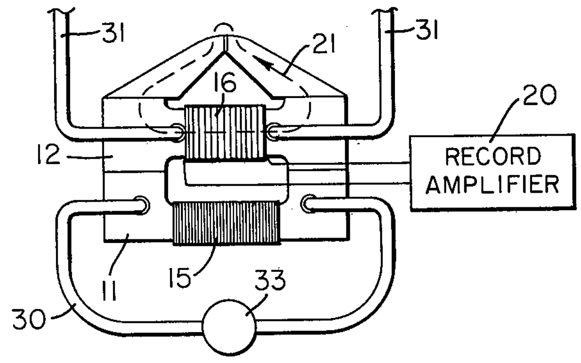
FIG. 5 is a plan schematic view of the embodiment of FIG. 4 illustrating the saturation of the ends of the playback leg during the record mode.
Figure 6:
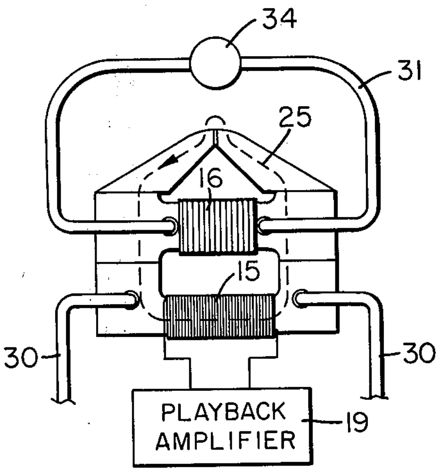
FIG. 6 is a plan schematic view of the embodiment of FIG. 4 illustrating the playback mode saturation of the ends of the record leg during the playback mode.

In an alternative embodiment, an applied magnetic field is used to locally saturate a portion of the leg not in use so that no appreciable signal flux will pass through it; in FIGS. 4–6 saturation is effected at both ends of the leg not in use. Various means may be used to generate the saturating magnetic field; the functional criterion is that the saturation be complete enough to insure that no appreciable amount of flux passes through and localized enough so that it does not interfere with the magnetic circuit path through the functioning leg. As shown in FIG. 4, a gating conductor 30 passes through both ends of back core leg 11 and a gating conductor 31 passes through both ends of back core leg 12. In the record mode, gating conductor 31 is open, low impedance record winding 16 is connected to record amplifier 20 and gating conductor 30 is connected to AC or DC current source 33. The flow of current past the ends of back core leg 11 produces a localized magnetic field which lowers the permeability, raises the reluctance and prevents the signal magnetic flux generated by winding 16 from passing through it. Mutual coupling of playback coil 15 with record coil 16 is also prevented. Similarly, as shown in FIG. 6, in the playback mode, gating conductor 30 is open and gating conductor 31 is connected to AC or DC current source 34. The flow of current through the ends of back core leg 12 produces a localized magnetic field which, as described above, prevents the signal flux picked up fron the moving magnetic tape from passing through it. It should be noted that the non-interference design criterion set out above has been observed by threading gating turn 31 inwardly of the extreme ends of back core leg 12. This positioning keeps the localized saturating field from interfering with the signal flux as the flux passes to back core leg 11 and returns.

The transducing characteristics for a particular application may be effected by selecting materials of suitable permeability in the frequency range within which the head will operate. Also, the relative positioning of the multiple legs can be used to optimize the characteristic of a particular leg. For example, as shown in the audio head of FIGS. 1–6, the record leg is placed adjacent the pole pieces to obtain a minimum reluctance path at the high record bias frequencies. A small number of windings is used (on the order of 30 turns) in the record mode since a low impedance is desired in order to keep the self resonance of the winding well below the high bias frequency used. A large number of windings is used (on the order of 1,000 turns) in the playback mode since as large an e.m.f. as possible must be generated to produce a significant signal providing that the signal/noise raio is within acceptable limits. In the case of the audio head illustrated in the Figures, the record leg 12 is constructed of ferrite material since a high biasing frequency is used in the record mode and ferrites have a high permeability at high frequencies. The playback leg 11 is constructed of an alloy such as permalloy which has a high permeability in the audio range but whose permeability drops off at high bias frequencies. This drop-off at high frequencies provides additional decoupling between the playback and record transducing coils when the head is operating in the record mode.

Figure 7:
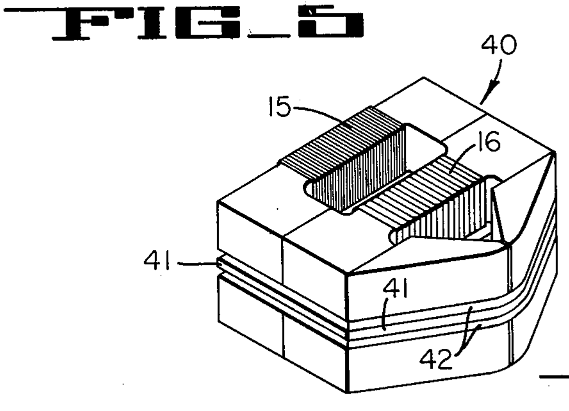
FIG. 7 is a perspective view of two magnetic transducer heads of the present invention assembled together with intervening nonmagnetic spacers and a high permeability magnetic shield to produce a multitrack configuration.

The multiple leg transducing head of the present invention can readily be stacked in multi-head assemblies. As shown in FIG. 7, a conventional high permeability magnetic shield 41 must be used between heads to prevent interference. Typically, nonmagnetic spacers 42 will also be employed. Such a stacked assembly could be used to perform the SEL-SYNC (registered trademark of Ampex Corporation) operation set out above.

While a number of specific embodiments of the present invention have been described in this specification such description is intended to be illustrative only and the scope of Letters Patent should be limited solely by the scope and spirit of the appended claims.

We claim:

1. A magnetic transducing head which has a recording and a reproducing operating mode and which may be electromagnetically switched between said operating modes, comprising a pair of pole pieces, each of said pole pieces having a smoothly lapped gap defining surface, said pair of pole pieces being symmetrically positioned with said gap defining surfaces in opposition to define a transducing gap therebetween, said gap containing a filler material;

a recording coil;

a reproducing coil;

a back core contiguous with said pole pieces and having a leg for receiving said recording coil and a leg for receiving said reproducing coil, each of said legs having a central coil receiving section, said respective coils each wound around said central coil receiving section of said particular leg, and each said leg providing a separate flux path;

said recording and reproducing coil being electrically separated from each other, the impedance of each respective coil being selected to satisfy the requirements of the particular operating mode of said magnetic transducer head; and electromagnetic means for selectively preventing an appreciable amount of magnetic flux from flowing through a given leg when said magnetic transducing head is operating in a mode which does not employ said given leg.

2. A magnetic transducing head in accordance with claim 1 wherein said electromagnetic means for selectively preventing an appreciable amount of magnetic flux from passing through said given leg comprises a means for shorting the particular coil wound around the central receiving section of said given leg.

3. A magnetic transducing head in accordance with claim 2 wherein said back core comprises two legs, the leg adjacent said pole piece having a low impedance recording coil and the second leg having a high impedance reproducing coil.

4. A magnetic transducing head in accordance with claim 3 wherein said pole pieces and said recording leg are fabricated from a ferrite material and said reproducing leg is fabricated from an alloy having a high permeability in the audio frequency range.

5. A magnetic transducing head in accordance with claim 1 wherein said electromagnetic means for selectively preventing an appreciable amount of magnetic flux from passing through said given back core leg comprises a means to generate a localized saturating magnetic field in said given leg.

6. A magnetic transducing head in accordance with claim 5 wherein said means to generate a localized saturating magnetic field comprises a means to generate a localized saturating magnetic field at each end of said given leg.

7. A magnetic transducing head in accordance with claim 6 wherein said means to generate a localized saturating magnetic field at each end of said given leg comprises a plurality of gating conductors, one conductor passing by the two ends of each leg and capable of carrying sufficient current to induce a localized saturating magnetic field.

8. A magnetic transducing head in accordance with claim 7 wherein said back core comprises two legs, the leg adjacent said pole pieces having a low impedance recording coil and the second leg having a high impedance reproducing coil.

9. A magnetic transducing head in accordance with claim 8 wherein said pole pieces and said recording leg are fabricated from a ferrite material and said reproducing leg is fabricated from an alloy having a high permeability in the audio frequency range.

10. A magnetic transducing head in accordance with claim 9 in combination with at least one other identical transducing head, said heads being positioned with their transducing gaps in parallel alignment and being separated by nonmagnetic spacers and a high permeability magnetic shield, for use in a SEL-SYNC (a registered trademark of Ampex Corporation) operation.

* * * * *